Feb. 18, 1969  H. J. KACHERGIS  3,428,089
DIVERTER VALVE ASSEMBLY
Filed March 9, 1967
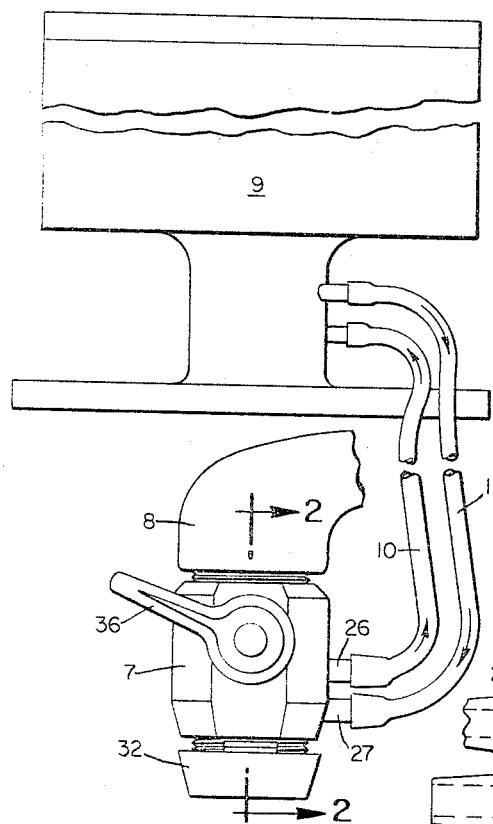
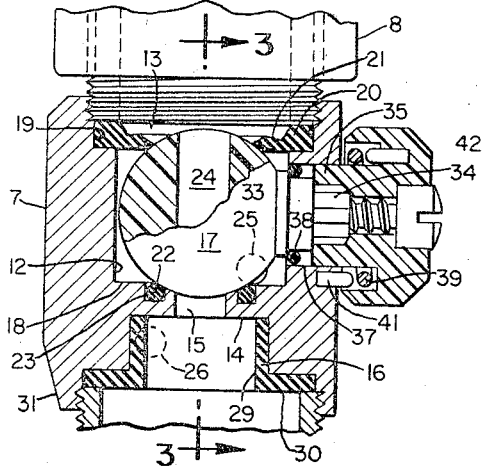

United States Patent Office 3,428,089
Patented Feb. 18, 1969

3,428,089
DIVERTER VALVE ASSEMBLY
Henry J. Kachergis, Waterbury, Conn., assignor to Scovill Manufacturing Company, Waterbury, Conn., a corporation of Connecticut
Filed Mar. 9, 1967, Ser. No. 621,956
U.S. Cl. 137—625.29        8 Claims
Int. Cl. E03b 7/07

ABSTRACT OF THE DISCLOSURE

A compact valve assembly for attachment to a water faucet normally allows direct flow of tap water, but may be easily operated to divert the flow through a filter or water purifier to the same outlet. The valve is shaped like a ball with an off-center passage, the inlet end of which is always in communication with a relatively large inlet passage, while the outlet end of the valve passage shifts from a primary outlet port into communication with a flow space around the ball shaped valve, which space is connected by a tube to a filter. The return flow from the filter enters the valve body on the downstream side of the main outlet port through a passage normally covered by a flexible rubber sleeve which acts as a check valve to prevent back flow to the filter when tap water is flowing directly to the outlet.

---

The invention relates to a diverter valve assembly especially useful for attachment to home water faucets. In locations where the water is not clear or contains impurities the diverter valve may be shifted to direct the flow through a small replaceable filter unit to obtain clear water for drinking and cooking purposes.

The only diverter valve known to be available for the same purpose before this invention has a slide valve component with a complicated arrangement of ports, difficult to make and assemble. It also has other faults such as tendency to leak and some back flow into the filter while the valve is in position to flow tap water directly to the outlet. It did not have a spring return action and it would be difficult to apply a spring to such a valve.

This invention not only overcomes the above faults but provides a valve assembly which is more compact, has better appearance and is easier to operate, always springing back to direct flow position after the desired amount of filtered water has been drawn. Other objects and advantages of the invention will hereinafter more fully appear.

In the accompanying drawings, I have shown for purposes of illustration, one embodiment which the invention may assume in practice. In these drawings:

FIG. 1 is a side elevation of my improved valve assembly as connected to a faucet and filter unit;

FIG. 2 is a central vertical section on line 2—2 of FIG. 1;

FIG. 3 is a central vertical section on line 3—3 of FIG. 2 showing the direct flow position;

FIG. 4 is a view similar to FIG. 3 but indicating the diverted flow position; and FIG. 5 is a top plan view of the valve assembly with portions removed to facilitate illustration.

A hollow valve body 7, which is made preferably of brass and chromium plated, may have suitable screw threads for easy attachment to a water faucet 8. A portable filter unit 9 containing carbonaceous or other filtering material may be placed at a convenient location near the faucet and connected to the valve body 8 through flexible tubes 10 and 11, the direction of flow being indicated by arrows. The valve body has a cylindrical bore defining a valve chamber 12, which opens at its upper end into a relatively large inlet passage 13. The bottom of the chamber 12 is partially closed by a wall 14 which has a central outlet port 15 leading from the chamber 12 to bottom cylindrical bore 16 constituting the main outlet passage.

A valve 17 which is rotatably mounted in the chamber 12, is preferably made of a suitable synthetic plastic material. It is of spherical shape or it may be called a ball valve. The diameter of the valve 17 is slightly less than that of the chamber 12 for ease of assembly and no seal is required between the ball valve and the cylindrical wall of the valve chamber. That portion of the valve chamber which is not occupied by the valve itself may be called a flow space 18 around the valve, although only a portion of such space may serve as a conduit when the water flow is diverted through the filter. Upstream of the valve chamber 12 is a somewhat larger bore 19 holding a sealing washer 20 of elastic material and having an inwardly extending flexible lip 21 to seat against the spherical surface of the valve 17. A seal is also provided at the bottom around the outlet port 15 by a rubber O-ring 22 mounted in an annular groove 23 in the wall 14. The passageway means through the valve 17 may be simply a cylindrical hole 24, whose axis as seen in FIG. 2, is in a central plane, but which is offset from the spherical center as seen in FIGS. 3 and 4 which are, of course, at right angles to FIG. 2. In the normal or first position of the valve shown in FIG. 3, the outlet end of valve passage 24 registers with the outlet port 15 while the inlet end is in an off-center position near the edge of lip 21 of the sealing washer 20. When the valve is rotated to its second position for diverted flow, the inlet end of the valve passage may move across the edge of lip 21 on the opposite side of the sealing washer 20 because in this position, no seal is needed between the valve and inlet.

In the illustrated embodiment, the valve chamber 12 is made cylindrical for simplicity and economy of manufacture so that the so-called "flow space" is rather substantial and the secondary outlet passage 25 leading to the filter may be at any convenient location around the valve body. However it is conceivable that, within the scope of the invention, the secondary outlet passage 25 may be aligned with the outlet end of valve passage 24 so that the utilized "flow space" might be extremely small.

A nipple 26 may be provided to connect the tube 10 with passage 25 and a similar nipple 27 connects the tube 11 with a return flow passage 28 leading into the main outlet passage 16. Fitted into the cylindrical bore or outlet passage 16 is a sleeve 29 of flexible material such as rubber, the sleeve having a retaining flange 30 surrounded by the lip 31 at the lower end of the body. This lip 31 may be internally threaded for attachment of an aerator 32 when desired. The sleeve 29 will act as a check valve to obviate the possibility of back flow into the filter when straight tap water is flowing. The sleeve will easily yield to allow water to flow around it from the filter to the main discharge passage 16 when the valve is in the position of FIG. 4.

The ball valve 17 may be molded with a short stem 33 having a splined section 34 of reduced diameter and a hub 35 of the handle 36 may have internal splines so that when the handle is pushed in place it will be non-rotatably connected to the valve. A cylindrical bore 37 in the valve body 7 serves as a supporting bearing for the valve stem, and an O-ring 38 provides a seal between the valve stem 33 and the valve body. A coil torsion spring 39 is nested in an annular recess 40 where it is held under tension with its ends 41 and 42 anchored in recesses in the valve body 7 and the handle 36 respectively. The spring 39 normally holds the valve in position for tap water as in FIG. 3 and when filtered water is wanted, the handle 36 is held down to maintain the valve in the position of FIG. 4. As soon as the handle is released the valve automatically springs back to its normal position so that the filter will not be used except when needed, thereby prolonging the useful life of the filtering material.

Any suitable stop means may be used to limit the swinging movement of the handle 36 in both directions so as to locate the valve properly in the first and second positions which have been described. I prefer, however, to shape the handle with a relatively curved beveled inner edge 43 extending part way around the outer cylindrical surface of the valve body 7. In the horizontal or mid-position of the handle as indicated in dotted lines in FIG. 3, the edge 43 is spaced slightly away from the valve body. When the handle is moved upwardly by the spring 38, the edge 43 strikes the upper portion of the valve body and likewise when the handle is manually pushed down it will be stopped by the edge 43 striking the lower portion of the valve body as seen in FIG. 4.

From the above description, it will now be apparent that a diverter valve assembly has been provided which is not likely to leak or allow back flow into the filter when tap water is being drawn. It consists of a minimum number of parts, none of which are difficult to manufacture. The valve is easily assembled in the one-piece valve body by inserting it stem first through the wide entrance passage and then angling the stem through the side of the body where the handle is attached. Automatic return action results from a simple spring which is easily installed between the valve body and handle. It is important in such a valve that the overall height be kept to a minimum. The off-center arrangement of the valve passage and the large entrance passage into which the valve extends are features which contribute to reduced height in a rotary valve assembly. Complicated passages in the valve and body which would be expensive to make are avoided.

I claim:
1. A diverter valve assembly comprising
   (a) a hollow body defining a valve chamber, an inlet passage leading to said chamber, a primary outlet port leading from said chamber and a main outlet passage downstream of said outlet port;
   (b) a valve rotatably mounted in said chamber and actuating means connected to said valve and located outside of said body, said means being operable to turn said valve between a first position for direct flow and a second position for diverted flow;
   (c) first and second sealing means mounted in said valve body around said inlet passage and said outlet port respectively, each of which seats against said valve;
   (d) said valve chamber providing a flow space around said valve between said first and second sealing means;
   (e) passageway means through said valve providing direct communication between said inlet passage and said outlet port in said first position of the valve, and in said second position providing communication from said inlet passage to only said flow space;
   (f) a secondary outlet passage leading from said flow space through said body and adapted for connection to the inlet of a filter or the like; and
   (g) a return flow passage through said valve body adapted for connection to the return line from such filter or the like and leading to said main outlet passage downstream of said primary outlet port.

2. A diverter valve assembly as defined in claim 1, wherein said valve is of generally spherical shape and wherein the outlet end of said valve passageway means moves from said outlet port across said second sealing means into communication with said flow space when the valve is turned from first to second position, while the inlet end of said valve passageway means remains in communication with said inlet port throughout such valve movement.

3. The combination of claim 2 wherein said valve passageway means is a straight cylindrical hole whose axis is located to one side of the center of said spherical shape.

4. The combination defined in claim 1 wherein said valve chamber is cylindrical and said inlet passage is of larger diameter than said chamber, said valve being ball shaped and having its upper portion projecting into said inlet passage and wherein said first sealing means is an annular member mounted in said inlet passage and having a flexible lip extending inwardly into sealing engagement with said ball shaped valve.

5. The combination of claim 1 further characterized by the outlet passage having a cylindrical interior surface and wherein a rubber sleeve normally bears against said surface and closes off said return flow passage, said sleeve being capable of flexing inwardly to permit flow from said return line to pass around said sleeve into said main outlet passage.

6. The combination defined in claim 1 wherein said valve has a spherical shape with a stem projecting horizontally through a lateral opening in said valve body, and wherein said actuating means includes a handle outside said body and secured to said stem, a coil torsion spring mounted between said handle and said valve body acting to urge said valve toward said first position and stop means to limit movement of said handle in each direction and thus locate said valve in either its first or second position.

7. The combination defined in claim 6 wherein said stop means consists of a portion of said handle curving around an exterior surface of the valve body, said handle portion being spaced a slight distance from such body surface when the handle is in mid-position.

8. The combination defined in claim 6 which also includes a hub on the valve fitting in said lateral opening in the valve body and serving as a bearing support for said valve and handle; and a seal between said stem and the interior surface of said lateral opening.

References Cited

UNITED STATES PATENTS

| 2,855,042 | 10/1958 | Kryzer | 137—625.29 XR |
| 2,920,652 | 1/1960 | Rudelick et al. | 137—625.29 |
| 3,168,110 | 2/1965 | Reynolds | 137—625.29 XR |
| 3,339,583 | 9/1967 | Fleckenstein et al. | 137—625.29 |

WALTER A. SCHEEL, *Primary Examiner.*

R. I. SMITH, *Assistant Examiner.*

U.S. Cl. X.R.

137—562